US006940554B2

(12) United States Patent
Robins et al.

(10) Patent No.: US 6,940,554 B2
(45) Date of Patent: Sep. 6, 2005

(54) CAMERA LENS CONTAMINATION DETECTION AND INDICATION SYSTEM AND METHOD

(75) Inventors: Mark Nelson Robins, Greeley, CO (US); Heather Noel Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 10/120,880

(22) Filed: Apr. 11, 2002

(65) Prior Publication Data

US 2003/0193604 A1 Oct. 16, 2003

(51) Int. Cl.[7] .................................... H04N 5/225

(52) U.S. Cl. .................. 348/335; 348/187; 348/207.99

(58) Field of Search ................................ 348/335, 187, 348/189, 214, 246, 92, 207.99, 241; 382/275; 396/429; 356/124; H04N 5/225, 9/64, 5/217, 5/21

(56) References Cited

U.S. PATENT DOCUMENTS

| | | | | | |
|---|---|---|---|---|---|
| 3,988,068 | A | * | 10/1976 | Sprague | 356/124 |
| 5,627,638 | A | * | 5/1997 | Vokhmin | 356/124 |
| 6,272,259 | B1 | * | 8/2001 | Mizoguchi | 382/275 |
| 6,791,608 | B1 | * | 9/2004 | Miyazawa | 348/246 |
| 2002/0093577 | A1 | * | 7/2002 | Kitawaki et al. | 348/241 |
| 2003/0133027 | A1 | * | 7/2003 | Itoh | 348/246 |
| 2003/0193604 | A1 | * | 10/2003 | Robins et al. | 348/335 |

FOREIGN PATENT DOCUMENTS

| | | | | | |
|---|---|---|---|---|---|
| JP | 05087739 | A | * | 4/1993 | G01N/21/88 |
| JP | 2001119614 | A | * | 4/2001 | H04N/5/225 |
| JP | 2001215170 | A | * | 8/2001 | G01M/11/00 |

* cited by examiner

*Primary Examiner*—Aung Moe

(57) ABSTRACT

Method and apparatus for detecting contamination of a Camera lens are disclosed.

19 Claims, 8 Drawing Sheets

CAMERA LENS CONTAMINATION DETECTION AND INDICATION SYSTEM AND METHOD

BACKGROUND OF THE INVENTION

The present invention relates generally to cameras, and more particularly to an apparatus and method for alerting the camera user of possible lens contamination before a picture is taken.

Camera lens contamination is a common problem, and may be caused by such factors as dust, dirt, fingerprints, and moisture. Camera users typically address lens contamination in two ways; by reducing its occurrence through careful handling of the camera and its lens, and by periodically inspecting the lens and cleaning it if it becomes contaminated.

To reduce the occurrence of lens contamination and protect the lens, a lens cover may be used. The cover may be removable, as in the case of a lens cap, or it may be integrated into the camera such that it is opened to permit picture-taking and is closed at other times to protect the lens. For example, U.S. Pat. No. 6,247,855 B1, to Motohashi et al., discloses a lens protecting cover-attached camera where a moving mechanism allows the lens cover to rotate from a closed position to an open position while remaining attached to the camera.

A lens cover, however, does not completely prevent lens contamination. Also, users may not notice lens contamination until it has already caused degradation in picture quality.

SUMMARY OF THE INVENTION

In one embodiment the invention may include a camera with a lens comprising a lens contamination detection system.

In another embodiment the invention may include a camera lens contamination sensing system comprising: means for sensing the intensity of light impinged thereon; and means for illuminating a camera lens with testing light such that little or no testing light reaches the means for sensing when the lens is free of contamination, and such that a sensible amount of testing light is scatteredly reflected by the contamination onto the means for sensing when the lens is contaminated.

In another embodiment the invention may include a method of detecting contamination of a lens comprising: directing testing light onto the lens at an orientation such that virtually none of the testing light which impinges on the lens will be directed to a sensing station when the lens is free of contamination but such that a sensible amount of the testing light which impinges on the lens will be directed to the sensing station when the lens is contaminated; and sensing the testing light which reaches the testing station and generating a sensing signal representative thereof.

DETAILED DESCRIPTION

One embodiment of a camera lens contamination detection system and method is illustrated herein through the use of a digital camera which is not of the single lens reflex (SLR) type, but rather has a separate viewfinder. It will be appreciated by those skilled in the art that a lens contamination system is equally applicable to digital SLR camera and may also be extended to photographic film cameras through the use of an electronic image sensor which may be contained, for example, in the mirror of an SLR or the lower interior sidewall of a camera barrel. Thus, the example illustrated herein to teach the principles of a lens contamination detection system is not to be taken as limiting the detection system to any particular type of camera.

Figure 1:
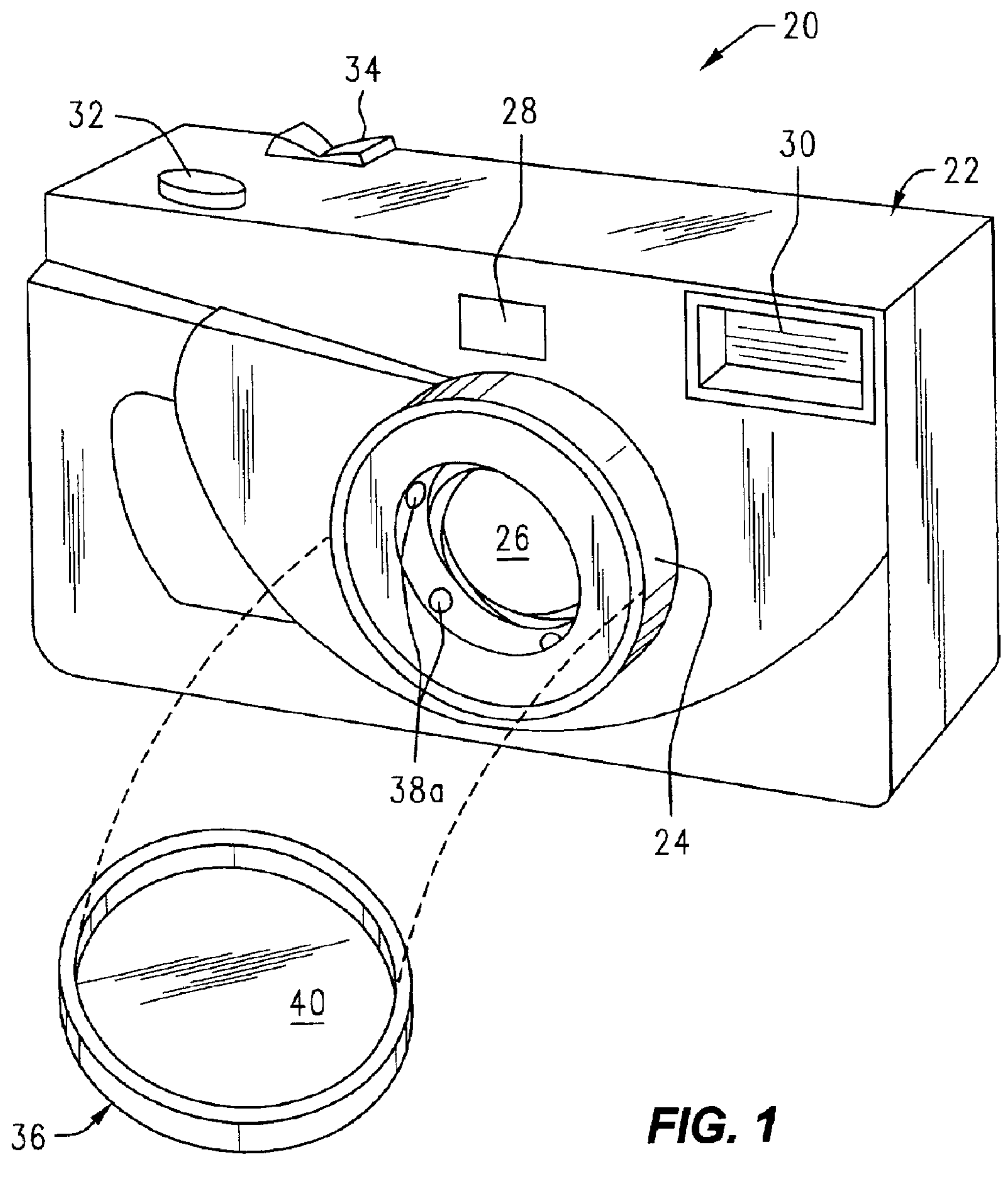
FIG. 1 is a perspective view of a camera having a camera lens contamination detection system.

Referring first to FIG. 1 a digital camera 20 is illustrated which has a camera body 22 with a lens barrel 24 protruding from the front thereof. The lens barrel 24 has a lens 26 mounted therein, which may have a plurality of lens elements as further illustrated in FIG. 2. The camera body 22 may also include a viewfinder 28 and a flash 30. The camera body 22 may further include a shutter release button 32 and a zoom switch 34. Shown as being removed from the lens barrel 24 in FIG. 1 is a lens cap 36, which may be mounted onto the distal end of the lens barrel 24 to protect the lens 26 from contamination and other damage. It will be appreciated that the lens cap 36 serves the same lens protection function as an internal lens cover 36*a*, shown in phantom in FIG. 2, which may be built into the digital camera as an alternative to a removable cap 36. Lens cover 36*a* may, for example, be of a known "iris" configuration.

FIG. 1 shows two additional elements which are components of a camera lens contamination detection system. The first of these elements is one or more light emitting diodes (LEDs) 38. The LEDs 38 are arranged around the inner periphery of the lens barrel 24. At least one, and preferably between three and five LEDs 38 may be used to generate sufficient light to detect contamination on the lens 26 as further described below. The LEDs 38 may be, for example, standard red light emitting diodes having a wavelength in the visible spectrum between 400 nM and 700 nM, or may be another type of LED. Any suitable light source may be used. A light-absorbent material segment 40 is located on the inside of the lens cap 36. This light-absorbent material segment 40 absorbs light directed thereupon (as, for example, light originating from the LEDs 38) to prevent it from reflecting back through the lens 26 to an image sensor as described further below.

Figure 2:
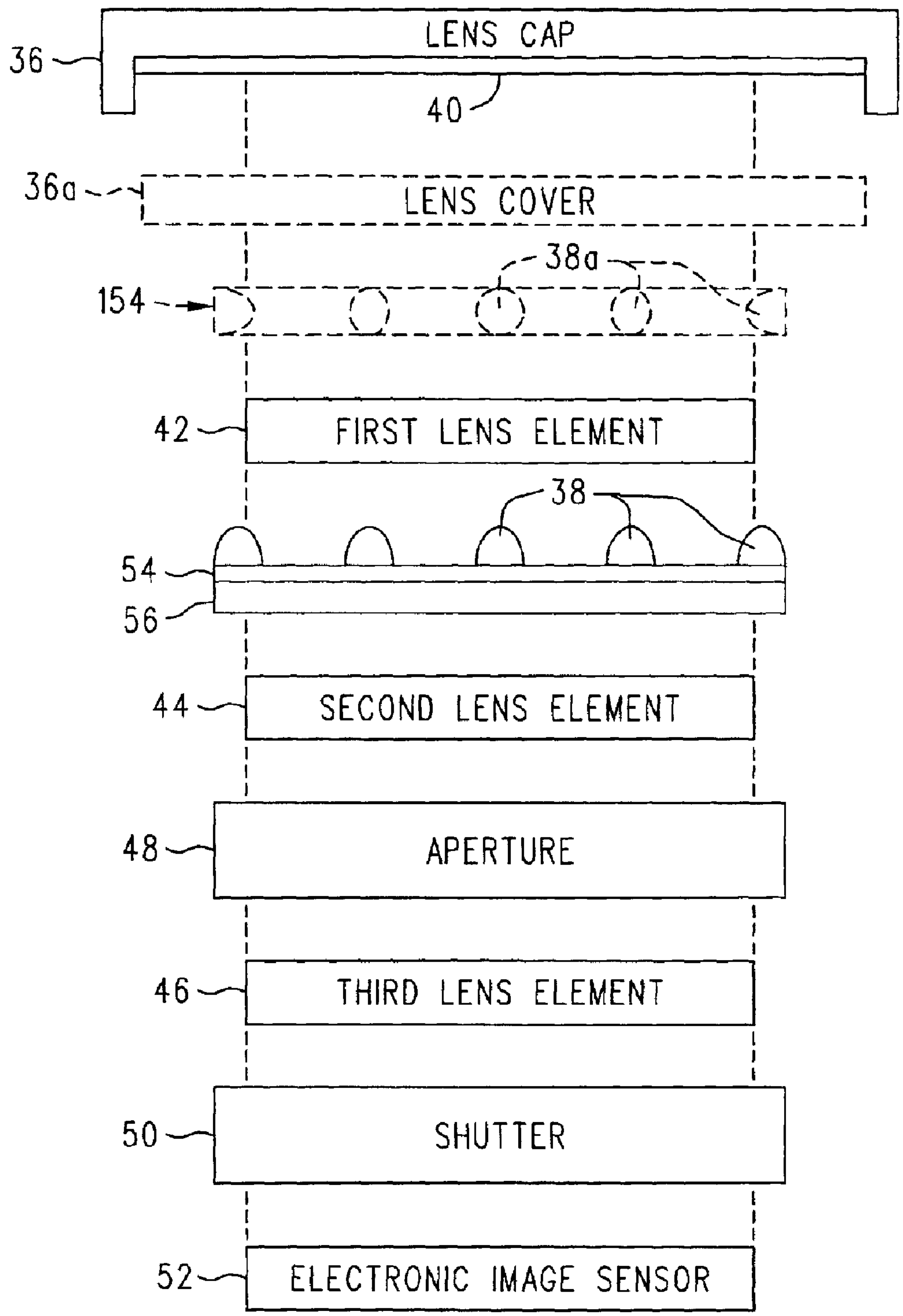
FIG. 2 is a schematic cross sectional view of the elements of a digital camera optical assembly showing alternate locations for LED components of a lens contamination detection system.

Referring next to FIG. 2, a schematic depiction is made of a three-element lens for a digital camera having both an aperture and a shutter. The three lens elements include a first lens element 42, a second lens element 44, and a third lens element 46. The first lens element 42 is the outermost element of the lens 26 of the digital camera 20 (shown in FIG. 1). The second lens element 44 is located between the first lens element 42 and the third lens element 46.

An aperture 48 is located between the second lens element 44 and the third lens element 46. The aperture 48 is controlled to admit more or less light into the camera. Light which enters the digital camera 20 through the first lens element 42 passes consecutively through the second lens element 44, the aperture 48, and the third lens element 46, with the passage of light then being directed through a shutter 50 and onto an electronic image sensor 52. The shutter 50 controls the time interval during which light from an object to be photographed is allowed to impinge on the electronic image sensor 52.

The front exterior surface of the first lens element 42 is located nearest to cap 36. The first lens element 42, the second lens element 44, the third lens element 46, the aperture 48, and the shutter 50 may all be components known in the art.

The light-absorbent material segment 40 may be adhesively secured to the inside of the lens cap 36. It may be made of material which absorbs substantially all of the light which is directed thereupon, and thus will reflect substantially no light back onto the lens. Material segment 40 may be, for example, a flat black disc having a fine texture which is highly resistant to smudging. Alternately, instead of using a disc for the light-absorbent material segment 40, the inside of the lens cap could be manufactured with a non-reflective flat black finish or may employ other light absorbing material. Alternative locations for the LEDs are shown in FIG. 2. In a first embodiment, one or more LEDs 38 are located at 54 between the first lens element 42 and the second lens element 44, with the LEDs 38 oriented to direct light toward the first lens element 42 as shown in more detail in FIG. 2A.

In this first embodiment, again referring to FIG. 2, a mask member 56 is located on the side of the LEDs 38 facing the second lens element 44, and effectively prevents light emitted from LEDs 38 from being directly transmitted (through the second lens element 44, the aperture mechanism 48, the third lens element 46, and the shutter mechanism 50) to the electronic image sensor 52. It should be noted that neither LEDs 38 nor the mask member 56 in any way substantially impedes light entering the digital camera 20 (shown in FIG. 1) through the first lens element 42 from reaching the electronic image sensor 52.

In this embodiment, substantially all of the light emitted from the LEDs 38, located at 54, will pass through the first lens element 42 so long as it is clean and free from contamination and scratches. However, in the event of contamination 58 existing on the outer surface of the first lens element 42, some of the light emitted from the LEDs 38 will be scatteredly reflected by the contamination back in a direction generally toward the electronic image sensor 52. This backscattering will ultimately result in some of the light passing through the second lens element 44, the aperture 48, and the third lens element 46, and the shutter 50 and onto the electronic image sensor 52, where it may be detected.

Figure 2A:
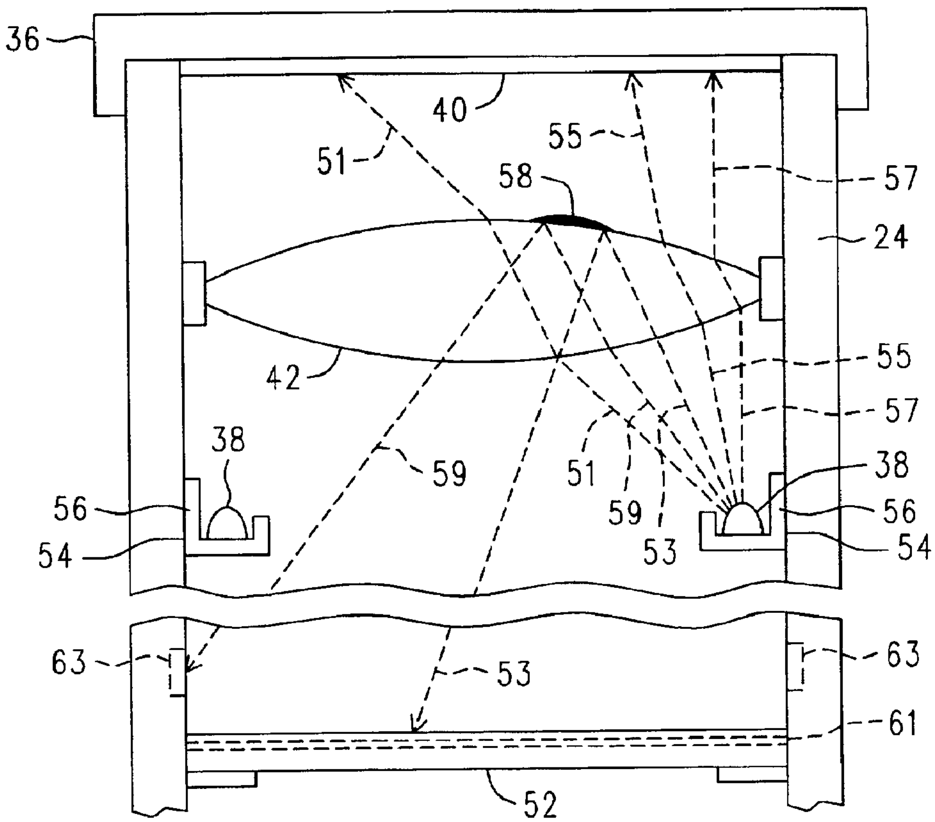
FIG. 2A is a schematic drawing illustrating one embodiment of a camera lens contamination detection system.

FIG. 2A illustrates this first embodiment in further detail. Only light emitted from one of the LEDs 38 is shown for illustrative purposes. Light emitted by the LEDs 38, e.g. light rays 51, 53, 55, 57, is directed toward the first lens element 42 (and is shielded from directly reaching the electronic image sensor 52 by the mask member 56). Light not meeting contamination on the first lens element 42, e.g. rays 51, 55, 57, passes outwardly through the lens and is absorbed by the light-absorbent material segment 40 on the interior of the lens cap 36.

However, that portion of light which is directed onto the area of contamination 58 is at least partially backscattered by the contamination 58. At least a portion of the backscattered light, e.g. ray 53, is directed onto the electronic image sensor 52, where it may be detected. The lens cap 36 when mounted on the lens barrel 24, prevents external light from reaching the electronic image sensor 52 during the contamination detection process. Thus, if no contamination were present and the lens cap were on, virtually no light would strike sensor 52 during the period that LEDs 38 are illuminated.

In another embodiment illustrated in phantom in FIG. 2A, photo sensor 52 is replaced by conventional film as indicated by 61, and a peripheral photo sensor 63 is provided along the light path between the LED's 38 and the film 61. These peripheral sensors 63 sense back scattered light, e.g. ray 59, from contamination 58 and generate a signal indicative thereof. In this film camera embodiment the lens shutter is opened and remains open during contamination testing. Thus, the lens contamination detection system may be incorporated into film cameras as well as digital cameras.

Figure 2B:
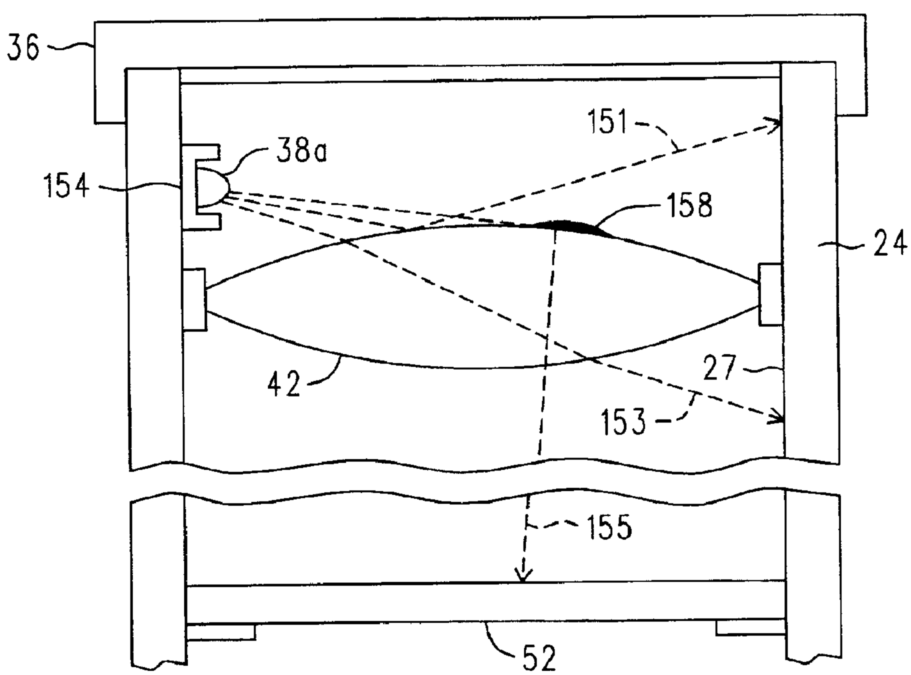
FIG. 2B is a schematic drawing illustrating another embodiment of a camera lens contamination detection system.

Referring back to FIG. 2, in another embodiment, one or more LEDs **38*a* are located at 154 at the periphery of the camera barrel proximate the front surface of the first lens element 42. LEDs 38*a* are oriented to direct light at an oblique angle with respect to the front surface of first lens element 42 as best shown in FIG. 2B. In this embodiment, the LEDs 38*a* are located so close to the perimeter of the first lens element 42 and so far removed from the lens central optical axis, that direct light from the LEDs 38*a* is prevented from being transmitted through the first lens element 42 to sensor 52. It should be noted that LEDs 38*a* do not in any way impede light entering the digital camera 20 (shown in FIG. 1) through the first lens element 42 from reaching the electronic image sensor 52**.

In this embodiment, most of the light emitted from LEDs **38*a* (only one shown in FIG. 2B) will be reflected off of the front surface of first lens element 42. A small amount of light will pass through the first lens element 42 at an orientation such that it is directed onto the non-reflective (absorptive) interior side 27 of the lens barrel 24, so long as the first lens element 42 is clean and free from contamination and scratches. However, in the event of contamination existing on the outer surface of the first lens element 42, some of the light emitted from LEDs 38*a* will be scattered by the contamination in a direction generally toward the electronic image sensor 52. This scattering of the oblique light will ultimately result in some of the light passing through the second lens element 44, the aperture 48, and the third lens element 46, and the shutter 50 and onto the electronic image sensor 52**, where it may be detected.

FIG. 2B illustrates that light emitted by the LEDs **38*a* at 154 is directed toward the first lens element 42 at an oblique angle to the lens outer surface. Light not meeting contamination on the first lens element 42 either is reflected off the first lens element 42, e.g. ray 151, or passes therethrough at an angle which will cause it to strike the interior surface 27 of the lens barrel 24, e.g. ray 153**, where it will be absorbed.

However, that portion of light which is directed obliquely onto the area of the first lens element 42 containing contamination 158 is at least partially scattered by the contamination 158, e.g. ray 155, and is directed onto the electronic image sensor 52 where it may be detected. (Again, when the lens cap 36 is mounted on the lens barrel 24 virtually no external light reaches the electronic image sensor 52 during the contamination detection process. Thus, essentially all of the light detected is light, e.g. 155, from LEDs 38*a* which is reflected by contamination 158 onto the sensor 52.) Suitable alternative structure, such as a peripheral sensor of the type shown in FIG. 2A, a sensor in a split light path (not shown), etc., could be employed to adapt the arrangement of FIG. 2B for use with a film camera.

Figure 3:
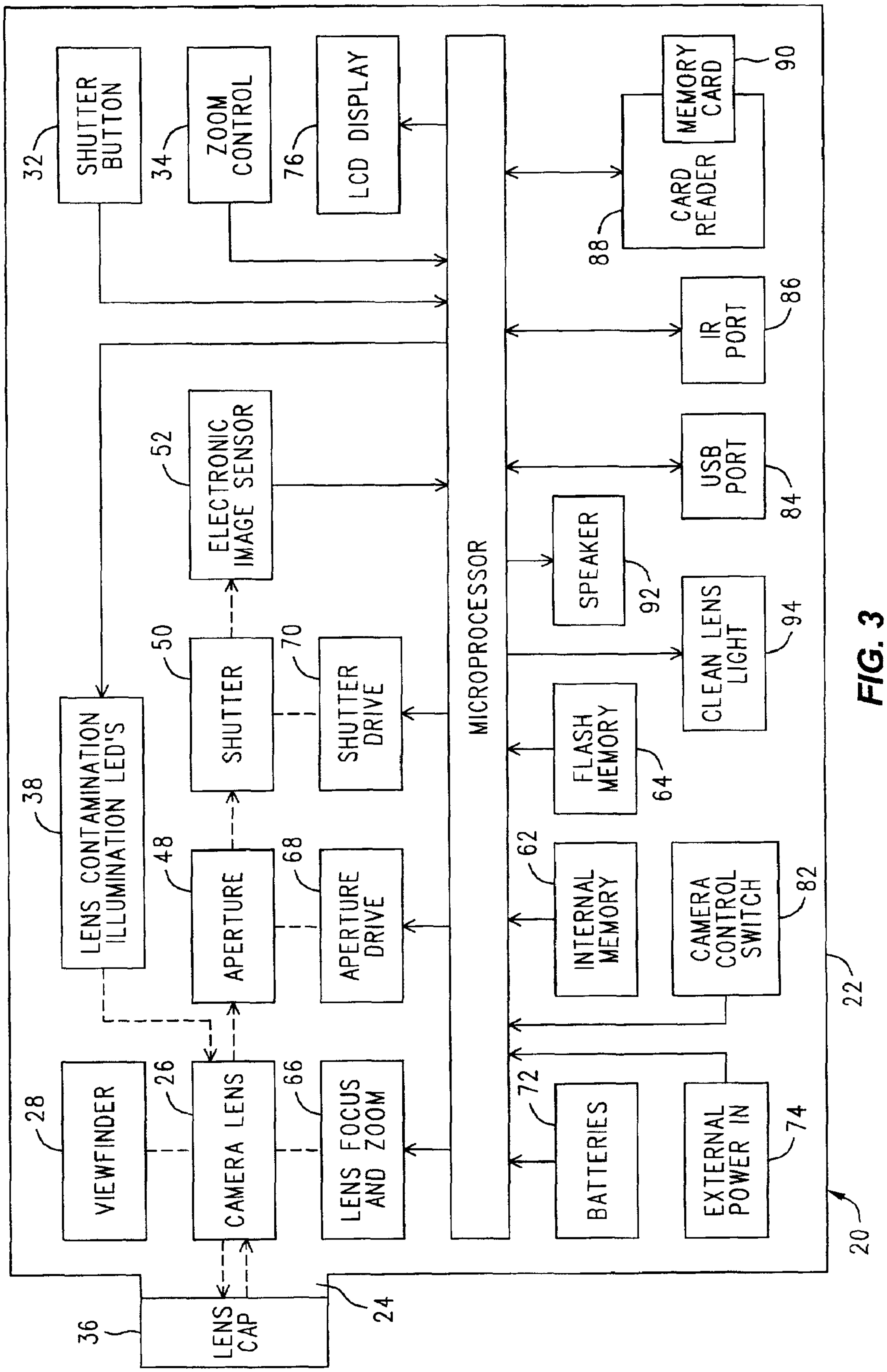
FIG. 3 is a functional schematic diagram of a digital camera having a camera lens contamination detection system.

Referring next to FIG. 3, a functional schematic of one embodiment of a digital camera 20 showing the major components thereof is illustrated with components which have been discussed in conjunction with FIGS. 1 and 2 being identified by the same reference numerals. The digital camera 20 thus may include camera body 22, lens barrel 24, lens 28 (which may include lens elements 42, 44 and 46) and viewfinder 28. Lens cap 36 is shown installed on the lens barrel 24 to cover the lens 26.

Also shown in the digital camera 20 are the aperture 48, the shutter 50, and the electronic image sensor 52. The operation of the digital camera 20 is controlled by a microprocessor 60, which can store and retrieve data from both a conventional memory 62 and a nonvolatile flash memory 64. The electronic image sensor 52 is connected to supply image information to the microprocessor 60. The microprocessor 60 may operate a lens focus and zoom mechanism 66 which controls the focusing and zooming of the elements of the lens 26. The operation of a lens focus and zoom mechanism 66 is known to those skilled in the art.

The microprocessor 60 may also operate an aperture drive 68 which controls the aperture 48, and a shutter drive 70 which controls the shutter 50. The operation of such drives is known in the art. The digital camera 20 may have electrical power supplied by batteries 72 and an AC adapter (not shown) which supplies electrical power through an external "power in" jack 74 contained in the digital camera 20.

The digital camera 20 may contain an LCD display 76 which is driven by the microprocessor 60. The operation of the digital camera 20 may be controlled by a shutter button 32 (which controls the taking of a picture and, optionally, may also be used to turn the camera on and off), a zoom control switch 34 (which is used to control the zoom function of the lens 26), and a multifunction camera control switch 82 (which may be used to select operations displayed on the LCD display 76). The LCD display 76, the shutter button 32, the zoom control switch 34, and the camera control switch 82 may all be mounted in the camera body 22.

Connectivity may be provided to the digital camera 20 through a USB port 84, an IR port 86, and a memory slot card 88, each of which is connected to the microprocessor 60. The USB port 84, the IR port 86, and the memory card slot 88 may all be mounted in the camera body 22. A removable memory card 90 may be installed in the memory card slot 88 to allow digital images captured by the digital camera 20 to be stored therein. A speaker 92 may be used to supply sound signals to the user of the digital camera 20, and is also mounted in the camera body 22 and is driven by the microprocessor 60.

The LED's 38 or 38*a* are driven by the microprocessor 60 and operate as described above. Either LED configuration or both may be employed. A lens contamination light 94 (also referred to herein as a "clean lens" light 94) is also driven by the microprocessor 60, and may be located in the viewfinder 28 to provide a visual warning signal to the user of the digital camera 20 that the lens 26 has contamination located thereon, and should be cleaned prior to taking a picture. If desired, an audible alarm can also be provided using the speaker 92.

Figure 4:
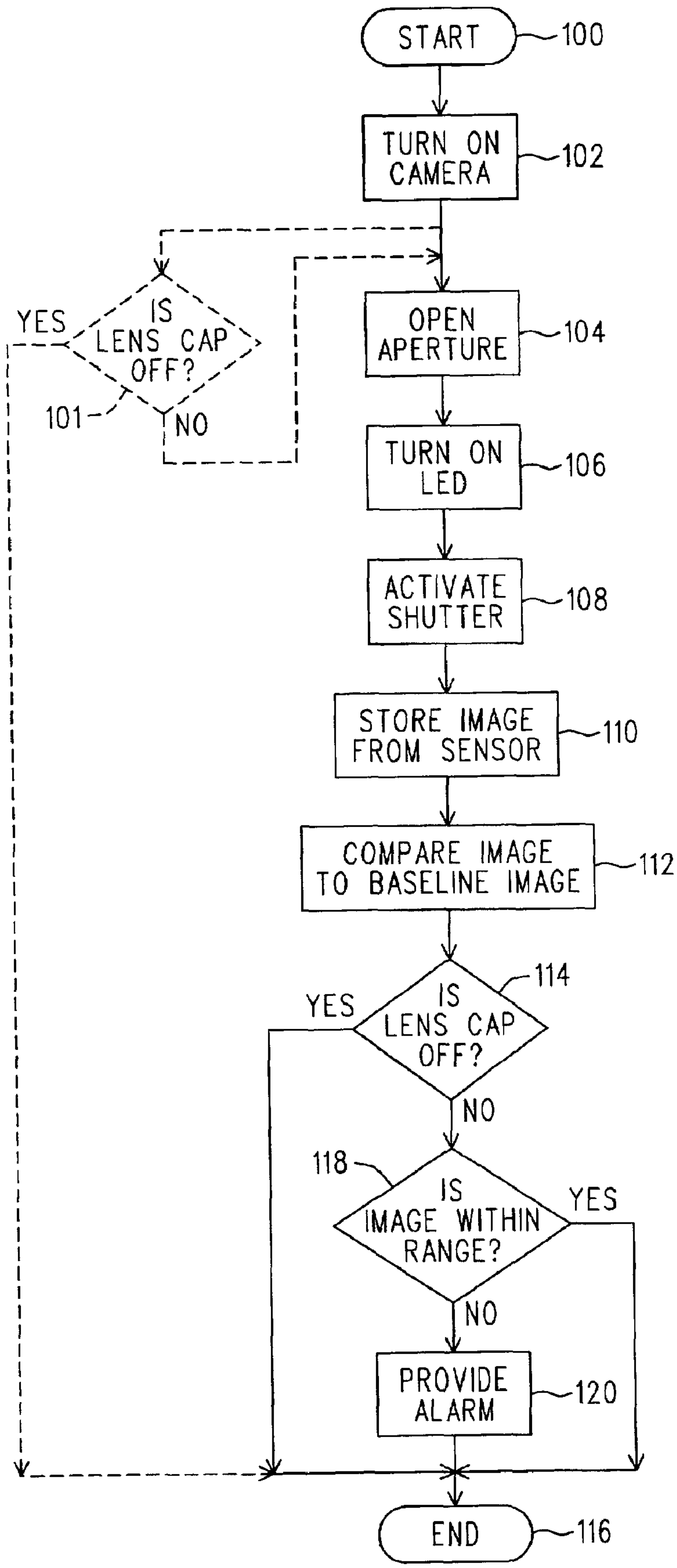
FIG. 4 is a flow diagram illustrating a camera lens contamination detection method.

Referring now to FIG. 4, the basic operation of a camera lens contamination detection system will be described. The procedure begins with a lens contamination detection initiation step 100, and then moves to a turn on camera step 102 in which the digital camera 20 is turned on.

The next process is an open aperture step 104 in which the digital camera 20 (as controlled by the microprocessor 60) will activate the aperture drive 60 to open the aperture to the maximum opening (f-stop).

The process then moves to a turn on LED step 106 in which the digital camera 20 (as controlled by the microprocessor 60) will turn on the LEDs 38/38*a* to cause them to illuminate the first lens element 42. Next, the process moves to an activate shutter step 108 in which the digital camera 20 (as controlled by the microprocessor 60) will cause the shutter drive 70 to open the shutter mechanism 50 to allow any light from LEDs 38/38*a* which is scattered through the lens system by contamination on the first lens element 42 to reach the electronic image sensor 52.

The process then moves to a store image from sensor step 110 in which the digital camera 20 (as controlled by the microprocessor 60) will temporarily store the image from the electronic image sensor 52, typically in the memory 62 (shown in FIG. 3). Next, the process moves to a compare image to baseline image step 112 in which the digital camera 20 (as controlled by the microprocessor 60) will compare the stored image with a baseline image, which is typically stored in the nonvolatile flash memory 64 (shown in FIG. 3).

The process next moves to a lens cap off determination step 114 in which the digital camera 20 (as controlled by the microprocessor 60) will check to see if the test result indicates that the lens cap 36 is on or off. If the comparison indicates a difference of sufficiently large magnitude to indicate that ambient light has reached the image sensor 52 the system assumes that the lens cap was off during the test. If this occurs, the test is treated as invalid, and no ultimate determination is reached, and hence no alarm is provided. In this case, the process will move to a lens contamination detection termination step 116, and the process will end.

If, on the other hand, in the lens cap off determination step 114 the digital camera 20 (as controlled by the microprocessor 60) determines that the magnitude of the difference between the stored image and the baseline image is not sufficiently large to indicate that the lens cap 36 was removed, the process will move to an image within range determination 118.

In the image within range determination 118, the digital camera 20 (as controlled by the microprocessor 60) will check to see if the test result indicates that the first lens element 42 (shown in FIG. 2) contains contamination thereupon. If the result of the comparison to the baseline image is the same or is different by an insignificant magnitude, this is interpreted as an indication that there was little or no scattered light from the LED's 38 and that the first lens element 42 does not contain contamination. In this case, no alarm is provided and the process will move to the lens contamination detection termination step 116, at which point the process will end.

If, on the other hand, the comparison indicates a difference of a predetermined sensed magnitude (but less than the magnitude associated with a cap off condition), this means that there was a significant amount of scattered light from the LED's 38 (shown in FIG. 2) and that there is contamination on the first lens element 42. In this case, the process will move to a provide alarm step 120 in which the digital camera 20 (as controlled by the microprocessor 60) will provide an indication to the user that there is likely contamination contained on the first lens element 42 (shown in FIG. 3). This will typically be done by illuminating the lens contamination indicator light 94 (shown in FIG. 3), and a warning tone may also be provided from the speaker 92 (shown in FIG. 3). At this point, following providing the alarm, the process will move to the lens contamination detection termination step 116 and end.

In one alternative embodiment a lens cap off determination step 101 may be performed immediately after start 100 in lieu of step 114. In this step 101 the digital camera 20 (as controlled by the microprocessor 60) will check a physical sensor (such as for example a plunger sensor, not shown) mounted on the camera barrel to determine if lens cap 36 is on or off. If lens cap 36 is off, lens contamination detection cannot be performed so the process moves to termination step 116 and the process ends. If on the other hand the lens cap is on, the process moves to an open aperture operation.

Referring finally to FIGS. 5A–5C, 6A–6C and 7A–7C, histograms are shown which illustrate one way in which the image obtained during the camera lens contamination detection test may be compared to the baseline image. In this scheme, histograms associated with each of the color component signal channels 150, 152, 154 of image sensor 52 are used. The number of pixels in each of a plurality of consecutive ranges (also known as "buckets") of pixel intensity are counted and stored for each color component channel. Such stored image data files are relatively small and easy to compare to other stored image data files Thus the obtained image and the baseline image are relatively easy to compare, since only a low level of computational power is required. (Of course many other methods of comparing image data are known in the art and could be used instead of the exemplary method described herein)

Figure 5A:
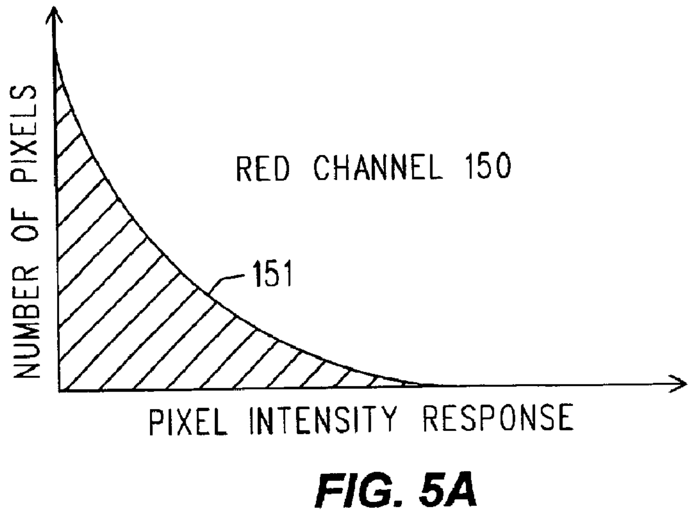
FIGS. 5A–5C are baseline color component histograms in the red, green and blue spectral ranges showing a pixel signature stored in nonvolatile memory which is characteristic of a clean lens.
Figure 5B:
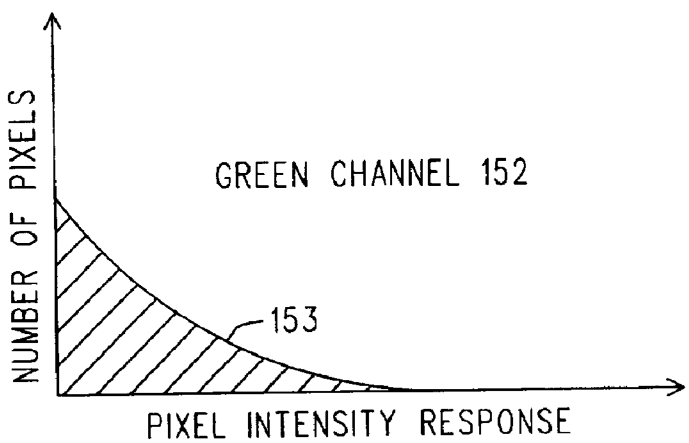
Figure 5C:
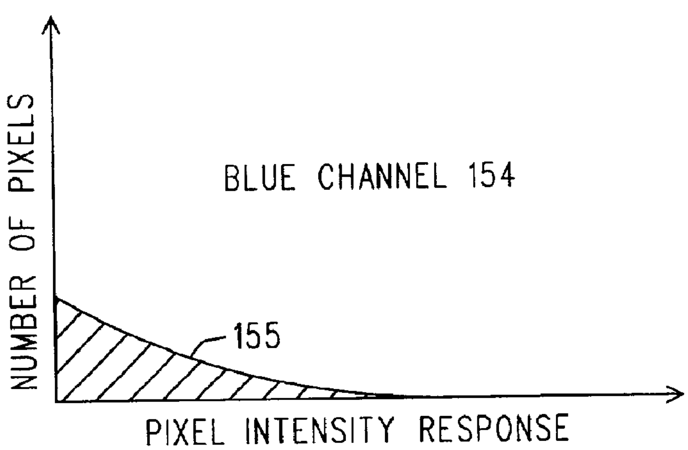
Figure 6A:
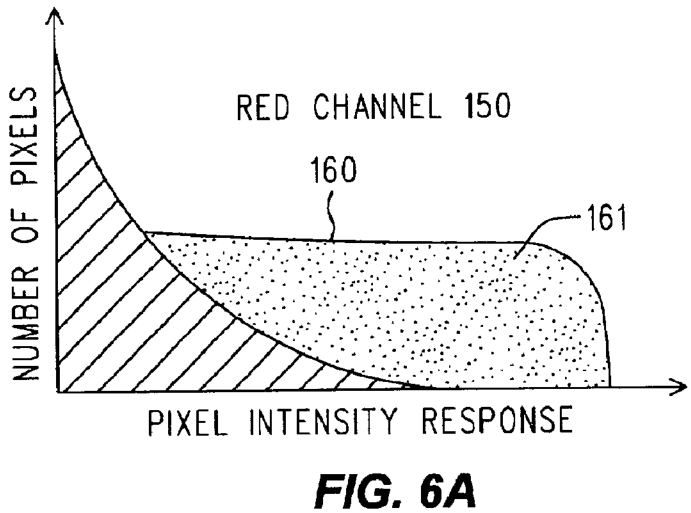
FIGS. 6A–6C are color component histograms in the red, green and blue spectral ranges showing a pixel signature which is exemplary of the presence of contamination on the lens.
Figure 6B:
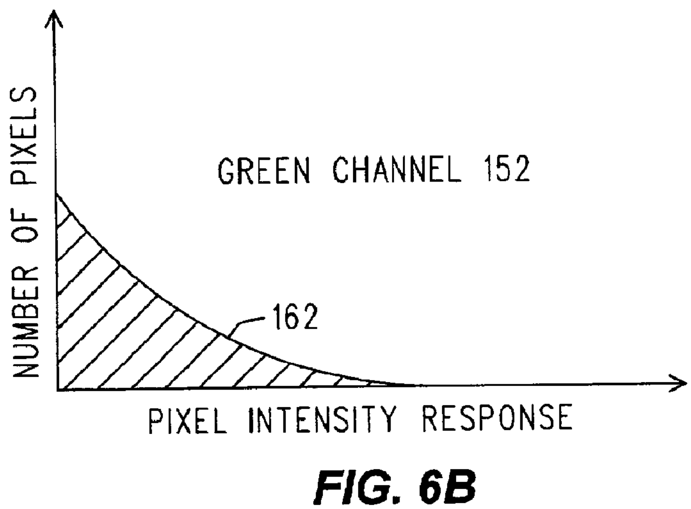
Figure 6C:
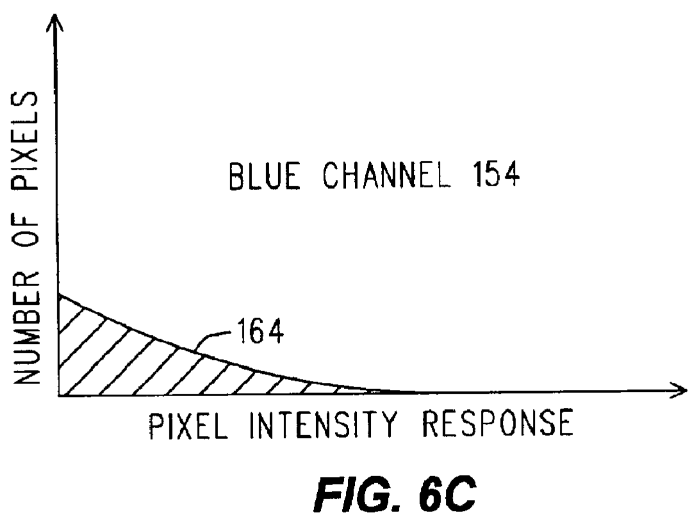
Figure 7A:
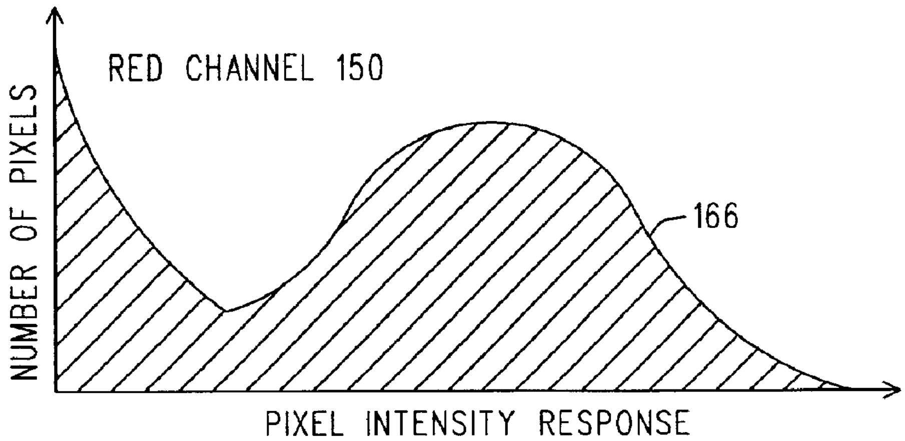
FIGS. 7A–7C are color component histograms in the red, green and blue spectral ranges showing a pixel signature which is exemplary of a camera with the lens cover removed.
Figure 7B:
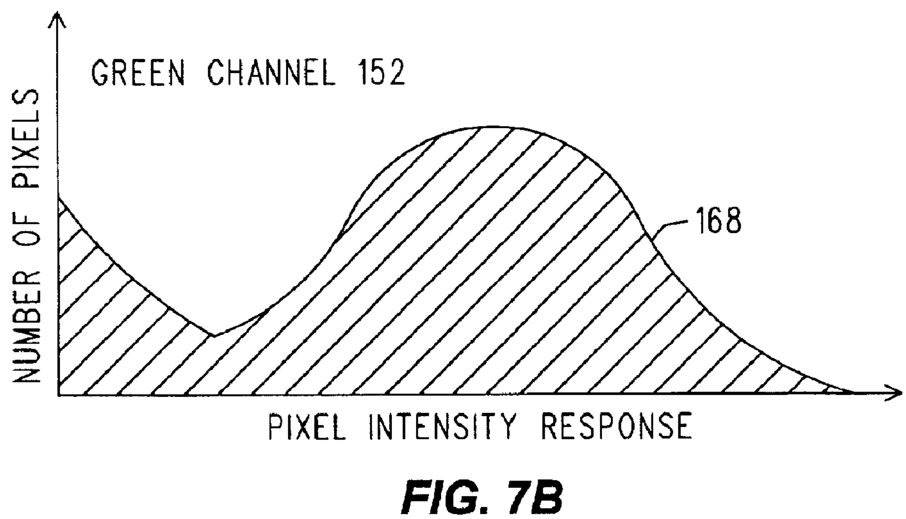
Figure 7C:
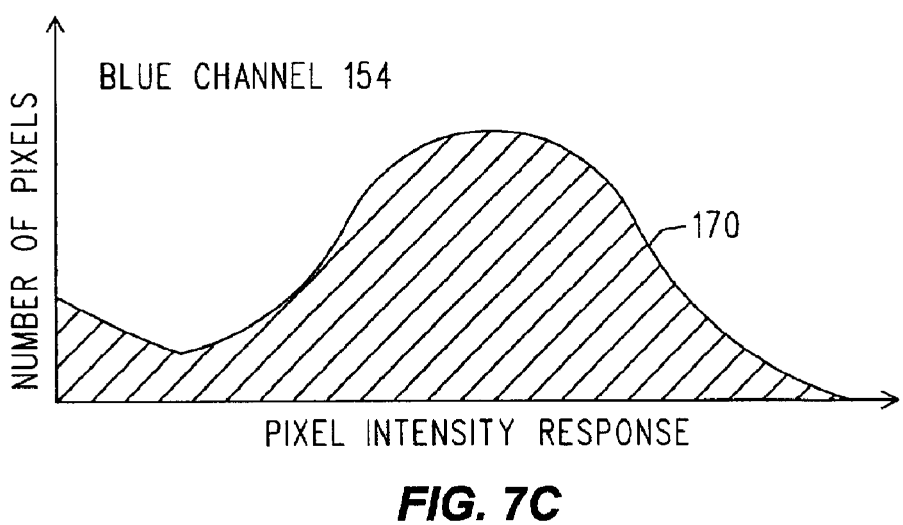

The histogram of FIGS. 5A–5C are thus the baseline image signature, with most of the pixels being contained in the lower intensity ranges in each color channel. Similarly, the histogram of FIGS. 6A–6C is the current stored image signature, with the shift in the signature between the histograms shown in FIGS. 5A–5C and 6A–6C being readily apparent, and indicative of a significant amount of contamination on the first lens element 42 (shown in FIG. 2). It will be appreciated by those skilled in the art that if the lens cap 36 (shown in FIG. 2) were removed from the digital camera 20, the shift in the pixel signature would be much more dramatic as illustrated in FIG. 7. Thus, by comparing the shift, the tests performed in the lens cap off determination step 114 and the image within range determination 118 of FIG. 4 may be accomplished with relative ease. In the sensing system embodiment having the pixel values shown in FIGS. 5–7, only red light LEDs 38 (or 38*a*) have been employed. Use of LEDs in a single spectral range, such as red, further facilitates comparison of signals because the increase in intensity associated with contamination appears primarily in one channel. In this case it appears in the red signal channel 150. Thus for base image comparison in which a red LED 38/38*a* is used only a base image red color component 150 graph 151, such as shown in FIG. 5A, is compared to the current red color component 150 image graph 160, such as shown in FIG. 6A. A significant difference, as indicated at 161 in FIG. 6A, indicates the existence of contamination on the camera lens. In other embodiments (particularly those employing white contamination detection light) two or more signal channels may be compared to determine if contamination is present, e.g. 151 is compared to 160, 153 is compared to 162 and 155 is compared to 164. (In a lens off condition graphs such as 151, 153 and 155 would be compared to color component graphs such as 166, 168, 170 illustrated in FIGS. 7A–7C.

It may be desirable to provide for recalibration of the camera lens contamination detection system. This may be accomplished using the operating system of the digital camera 20. In this situation, the baseline image information may be modified to compensate for aging of the camera or permanent damage to the lens such as small scratches which, unlike lens contamination, cannot be removed by merely cleaning the lens. In this situation, the menu would instruct the user to clean the first lens element 42 (shown in FIG. 2) well, then to place the lens cap 36 (shown in FIG. 2) on the digital camera 20, and then to perform the recalibration. This will prevent false alarms from being given to indicate the presence of contamination on the first lens element 42 when there has been a permanent degradation of the first lens element 42, but it is otherwise clean.

Another way of implementing the comparison test would be to simply generate a numerical value based upon the cumulative light intensity indicated by the sensor during the current testing period and then generate an alarm if the numerical value is within a predetermined range representative of a contaminated lens. That range could be determined through empirical methods performed on similar cameras or the same camera. The upper limit of the range would take into account a lens off condition.

It will be appreciated that the above detailed description teaches a detecting and indicating system and method which detects possible lens contamination and alerts the digital camera user of this lens contamination before a picture is taken. The camera lens contamination detection system may be calibrated to detect any desired level of contamination which is perceived by the designer to cause picture quality degradation. The detection and indication system may perform the detection and indication functions whenever the digital camera is first turned on, so that a check for contamination on the lens may be made prior to each time the camera is to be used. Alternatively the detection function may be implemented in a manner such that it is selectable or overrideable by the camera user.

The camera lens contamination detection system and method of the present invention provide an indication to the user which may be placed in a prominent location on the camera e.g. within the viewfinder, so that it is highly visible, and/or an audible alarm may be provided to draw the user's attention to the contaminated lens.

The camera lens contamination detection system may be built into the camera, and may be digitally implemented to function completely automatically, without requiring any input from the camera user. The camera lens contamination detection system may include the ability to compensate for the camera getting older, as well as for any scratches or other permanent damage which occur to the lens which could otherwise cause a less sophisticated system or method to produce false indications of lens contamination upon each use thereof.

What is claimed is:

1. A system for detecting the presence of contamination on a lens of a camera having a digital image sensor, the system comprising:

a lens cover shielding the lens from external light;

a light source located between the lens cover and the digital image sensor for directing light toward the lens;

wherein if there is no contamination on the lens, substantially none of the light from the light source reaches the digital image sensor; and if there is contamination on the lens, a portion of the light from the light source is scattered by the contamination and directed onto the digital image sensor;

a contamination detector for receiving from the digital image sensor signals caused by the scattered light from the light source and determining the presence or absence of contamination on the lens; and a device for providing a signal to a user of the camera when the contamination detector determines that contamination is present on the lens.

2. The system according to claim 1 further comprising:

said lens cover having a light absorbent inner surface for absorbing substantially all of the light from the light source impinging on the lens cover.

3. The system according to claim 1 wherein the lens cover is a removable lens cap.

4. The system according to claim 1 wherein the lens cover is a moveable lens cover built into the camera.

5. The system according to claim 1 wherein said light source comprises at least one LED.

6. The system according to claim 5 wherein said at least one LED is located at the periphery of the lens barrel.

7. The system according to claim 1 further comprising a mask member that prevents light from the light source from directly illuminating the digital image sensor.

8. The system according to claim 1 wherein the contamination detector comprises:

a memory for storing data representative of digital image sensor signals produced during a previous operation of the system;

a processor for converting current digital image sensor signals into data representative of the current digital image sensor signals; and a comparator for comparing the data representative of the current digital image sensor signals with the stored data.

9. The system according to claim 1 wherein the light source located between the lens cover and the digital image sensor for directing light toward the lens is located between the lens cover and the lens.

10. The system according to claim 1 wherein the light source located between the lens cover and the digital image sensor for directing light toward the lens is located between the lens and the digital image sensor.

11. A camera with a lens comprising:

a lens contamination detection system;

wherein the lens contamination detection system comprises an internal light source located at an inner periphery of a lens barrel portion of the camera.

12. The camera of claim 11:

the camera having a first mode of operation wherein the lens is not contaminated and wherein virtually no light from the light source which impinges on the lens reaches a camera photosensor; and the camera having a second mode of operation, wherein the lens is contaminated, wherein sensible light from the light source which impinges on the lens reflects from contamination on the lens onto the camera photosensor.

13. The camera of claim 11 wherein the camera is a digital camera.

14. The camera of claim 11 wherein the camera is a film camera.

15. A camera lens contamination sensing system comprising:

means for sensing the intensity of light impinged thereon; and means for illuminating a camera lens with testing light such that little or no testing light reaches the means for sensing when the lens is free of contamination, and such that a sensible amount of testing light is scatteredly reflected by the contamination onto the means for sensing when the lens is contaminated.

16. A camera comprising:

a lens contamination sensing system comprising:

means for sensing the intensity of light impinged thereon; and means for illuminating a camera lens with testing light such that little or no testing light reaches the means for sensing when the lens is free of contamination, and such that a sensible amount of testing light is scatteredly reflected by the contamination onto the means for sensing when the lens is contaminated.

17. A method of detecting contamination of a lens comprising:

providing a lens cover shielding the lens from external light;

providing a light source located between the lens cover and a sensing station;

directing testing light from said light source onto the lens at an orientation such that virtually none of the testing light which impinges on the lens will be directed to the sensing station when the lens is free of contamination but such that a sensible amount of the testing light which impinges on the lens will be directed to the sensing station when the lens is contaminated; and sensing the testing light which reaches the testing station and generating a sensing signal representative thereof.

18. The method of claim 17 further comprising:

generating a contamination alert signal when the sensing signal is within predetermined parameters.

19. A method of operating a camera comprising:

shielding a camera lens assembly and photosensor from external light;

illuminating the camera lens assembly with test light from an internal light source; and based upon the amount of test light reaching the photosensor assembly determining whether the lens is contaminated.

* * * * *